United States Patent [19]

Dupuis et al.

[11] Patent Number: 5,685,898

[45] Date of Patent: Nov. 11, 1997

[54] POLYMERIC RESIN OF ADJUSTABLE VISCOSITY AND PH FOR DEPOSITING CATALYTIC PALLADIUM ON A SUBSTRATE

[75] Inventors: Olivier Dupuis; Mary-Hélène Delvaux, both of Chastre; Pascale Dufour, Rixensart; Marie-Carmen Malerno Fernandez, Brussels; Jean-Philippe Soumillion, Grez Doiceau; Henri Sendrowicz, Brussels, all of Belgium

[73] Assignee: Blue Chips Holding, Luxembourg, Luxembourg

[21] Appl. No.: 513,884

[22] PCT Filed: Dec. 30, 1994

[86] PCT No.: PCT/BE94/00099

§ 371 Date: Nov. 2, 1995

§ 102(e) Date: Nov. 2, 1995

[87] PCT Pub. No.: WO95/18879

PCT Pub. Date: Jul. 13, 1995

[30] Foreign Application Priority Data

Jan. 5, 1994 [BE] Belgium .................................. 9400003

[51] Int. Cl.$^6$ .......................... C23C 18/16; C23C 18/20; C23C 18/28; C08K 13/02

[52] U.S. Cl. ................ 106/1.11; 106/194.1; 106/195.1; 106/198.1; 106/181.1; 524/300; 524/403; 427/98; 427/126.1; 427/304

[58] Field of Search .................... 106/1.11, 194.1, 106/195.1, 198.1, 181.1; 524/300, 403; 427/98, 126.1, 304

[56] References Cited

U.S. PATENT DOCUMENTS

| 3,900,320 | 8/1975 | Rolker et al. | 106/1.11 |
| 4,004,051 | 1/1977 | Kadison et al. | 427/304 |
| 4,622,069 | 11/1986 | Akai et al. | 106/1.11 |
| 4,652,311 | 3/1987 | Gulla et al. | 106/1.11 |
| 4,910,072 | 3/1990 | Morgan et al. | 106/1.11 |

FOREIGN PATENT DOCUMENTS

| 0250867 | 1/1988 | European Pat. Off. |
| 9312267 | 6/1993 | WIPO |

*Primary Examiner*—David Brunsman
*Attorney, Agent, or Firm*—Spencer & Frank

[57] ABSTRACT

A polymeric resin of adjustable viscosity and pH for depositing catalytic palladium on a substrate, comprising in combination a palladium salt, a complexing agent of the carboxylic acid or chloride type, a water soluble polymer containing hydroxyl and/or carboxyl groups, an alkaline compound and a solvent chosen amongst water, methanol and ethanol, its preparation method and applications.

41 Claims, No Drawings

POLYMERIC RESIN OF ADJUSTABLE VISCOSITY AND PH FOR DEPOSITING CATALYTIC PALLADIUM ON A SUBSTRATE

The present invention relates to a polymeric resin of adjustable viscosity and pH for depositing catalytic palladium on substrates, the method for preparing it and use thereof. This is a filing under rule 371 based on PCT/BE94/00099, published as WO95/18879 Jul. 13, 1995.

The objective of the invention is to deposit catalytic palladium in view of metallizing this palladium by means of autocatalytic or electroless baths. Usually, autocatalytic baths are initiated by means of catalysts based on a palladium-tin colloid. In order to achieve a selective deposit by means of this catalyst, use has to be made of photosensibilizers. The substrate pretreated by means of the $PdCl_2$ catalyst is completely covered with metal by means of autocatalytic baths. Photosensitive resists are coated thereon. Subsequently, the whole is irradiated with ultraviolet light through a mask. The development of the irradiated resist results in the circuit pattern. To reduce the number of chemical processing steps, a large number of processes have been proposed for selectively depositing palladium. However, all of these processes show a certain number of drawbacks from the point of view of both the stability of the palladium product and the number of steps and the flexibility of applying said product.

In this respect, K. Kondo et al. have proposed in their article "Photochemical Deposition of Pd(0) from Adsorbed Pd(II)-Complex Ions", J Electrochem. Soc., Volume 139, No.10, October 1992, a palladium sensibilizer allowing to metallize selectively ceramic products, and more particularly 96% alumina. This product is prepared by mixing palladium chloride ($PdCl_2$) and a ligand such as tartaric acid in water, in a molar ratio of 5. The pH of this system is subsequently adjusted to 9.3 by addition of sodium hydroxide. The alumina plates are then immersed in the solution for ten minutes and for three minutes in deionised water. Then they are dried at room temperature. Thereafter, the plates are irradiated through a mask for six minutes with a mercury vapour lamp, the surplus of non-irradiated product being removed by immersing the substrate for five minutes in a hydrochloric acid solution at 60° C. Subsequently, they are selectively plated with copper, according to the mask pattern, by means of autocatalytic copper baths. The main drawback of the thus obtained sensibilizing palladium solution is its lack of stability in time. It will also be noticed that the number of steps for applying the solution is still large and that insolation through a mask is obligatory and is the only useful method for applying the product. The other major drawback is that the products of Kondo can not be considered either as resin (they do not contain polymers) but rather as solutions, nor as products of adjustable viscosity. In fact, applying the solutions of Kondo can only be done by adsorption on the substrate.

Applicant's patent application WO93/12267 relates also to a polymeric resin for depositing metal on substrates, comprising a coordination compound and a cellulose derivative, in solution in dimethylformamide or water as solvent in function of the nature of the cellulose derivative and the metal compound. Major drawbacks resulting from the use of these polymeric resins are the fact that they are not suited for certain polymeric substrates such as polyvinyl chloride, polycarbonate, polyamide, that use thereof with ultraviolet lamps is very limited because they only decompose with high power lamps at 254 nm and that their viscosity is only adjustable within a smaller range.

Moreover, the means for applying these resins are limited. Ink jet for example can not be used. Further, no additions are possible.

One of the essential objects of the present invention consists consequently in obviating the above mentioned drawbacks and to present a polymeric resin of adjustable viscosity and pH for depositing catalytic palladium on a substrate, which is extremely stable in time, which can be used with a large number of application techniques such as by means of ink jet, spin-coating, plotter pen, serigraphy, pad, brush, chinese ink pen, spraying, etc, and which allow an either or not selective metallization metallization (for example Cu, Ni, Ag, Au) of ceramic products, plastic or polymeric products, wood, metals.

To this end, the polymeric resin according to the invention comprises in combination a palladium salt, a complexing agent of the carboxylic acid or chloride type, a water soluble polymer containing hydroxyl and/or carboxyl groups, an alkaline compound and a solvent chosen amongst water, methanol and ethanol.

According to an advantageous embodiment of the invention, the palladium salt is chosen amongst palladium chloride, palladium sulphate, palladium nitrate, and mixtures thereof, the complexing agent of the carboxylic acid type is chosen within the group comprising carboxylic acids, μ-hydroxycarboxylic acids, carboxylic polyacids and mixtures thereof and the complexing agent of the chloride type is chosen amongst hydrochloric acid and chlorinated salts, the hydroxyl and/or carboxyl groups containing polymer is chosen amongst cellulose polymers, acrylic polymers, and mixtures thereof and the alkaline compound is an alkaline salt, a base or a mixture thereof.

According to another advantageous embodiment of the invention, the polymeric resin comprises at least a wetting agent, a colorant, an adherence promoter, a surfactant, or an antifoaming agent, or a combination of two or more of these agents.

According to a particularly advantageous embodiment of the invention, the concentration of palladium salt is of 0.05 to 5% by weight and preferably of 0.1 to 1.0% by weight, the concentration of complexing agent of the carboxylic acid or chloride type is of 0.01 to 5% by weight and preferably of 0.04 to 2.0% by weight, the concentration of hydroxyl and/or carboxyl groups containing polymer is of 0.1 to 15% by weight and preferably of 0.1 to 7% by weight and the concentration of alkaline compound is of 0.01 to 5% by weight and preferably of 0.01 to 2.5% by weight when the alkaline compound is an alkaline salt and of 0.01 to 2.5% by weight and preferably of 0.1 to 1.5% by weight when the alkaline compound is a base, the possible total concentration of the above mentioned agents is of 0.01 to 5% and preferably of 0.01 to 3% by weight, the remaining weight percent being formed by a solvent.

According to another particularly advantageous embodiment of the invention, the polymeric resin comprises demineralized water as solvent.

The present invention also relates to the preparation of these polymeric resins, which consists in mixing separately, on the one hand, the palladium salt and the complexing agent of the carboxylic or chloride type in two-thirds of the total solvent volume until they are completely dissolved to form a first solution and, on the other hand, the polymer in one-third of the total solvent volume until it is dissolved completely to form a second solution, adding the first solution to the second solution or vice versa, mixing, adjusting the pH to the desired value between 1 and 10 by adding the alkaline compound and finally, in function of the considered use of the resin, possibly incorporating one or more of the different agents such as a wetting agent, a colorant, an antifoaming agent, an adherence promoter, or further a surfactant, as well as the use of these polymeric resins for metallizing vias, making prototypes of and manufacturing printed circuits, manufacturing sensors, as electromagnetic protections and decorative articles or patterns.

Other details and particularities of the invention will become apparent from the description given hereinafter by way of non limiting example of polymeric resins according to the invention, the preparation and uses thereof for depositing catalytic palladium onto the surface of substrates as well as for metallizing these surfaces.

As it has already been set forth previously, the object of the polymeric resins of the invention consists in replacing the hitherto known palladium solutions and polymeric resins, the main drawbacks of which are the fact that the solutions are not stable in time, the method of applying them is limited (adsorption on the substrate) and their viscosity and pH are not adjustable, and that the resins are not suited for most of the polymeric substrates (PVC, polycarbonate, polyamide), do not permit to metallize vias, can not be used with high power U.V. lamps at 254 nm, require more steps for being applied, have a viscosity which is adjustable in a small range and can not be applied by simple means such as a plotter pen ("rotting"). It is in this way that, according to the present invention, polymeric resins of adjustable viscosity have been developed comprising, in combination, a palladium salt, a complexing agent of the carboxylic acid or chloride type, a water soluble polymer containing hydroxyl and/or carboxyl groups, an alkaline compound and a solvent such as water, advantageously demineralized water, methanol and ethanol. The advantages of an adjustable viscosity and pH reside in the fact that the resin may be applied through different techniques, such as by means of spin-coating, immersion coating, an ink jet, a pen, a ball-point pen (fountain pen, plotter pen) and in the fact that films of an adjustable and controlled thickness can be obtained.

Some advantageous examples of different compounds forming the polymeric resins of the invention are given hereinafter. Examples of palladium salts are palladium chloride, palladium sulphate, palladium nitrate, and mixtures thereof, palladium chloride appearing to be particularly advantageous. Examples of complexing agents of the carboxylic acid type are carboxylic acids, α-hydroxycarboxylic acids, carboxylic polyacids and mixtures thereof. In this respect, succinic acid, mesoxalic acid, gluconic acid and mixtures thereof are suited as carboxylic acids, tartaric acid, malic acid, citric acid and mixtures thereof are suited as α-hydroxycarboxylic acids and atactic polyacrylic acid, polymethacrylic acid and mixtures thereof are suited as carboxylic polyacids. Examples of complexing agents of the chloride type are hydrochloric acid and chlorinated salts such as sodium chloride. Examples of water soluble polymers containing hydroxyl and/or carboxyl groups are cellulose polymers, and more particularly hydroxylcellulose polymers, acrylic polymers, and mixtures thereof. In this respect, carboxymethylcellulose, hydroxypropylmethylcellulose, and mixtures thereof are advantageous examples of cellulose polymers, and polyacrylic acid, polymethacrylic acid and mixtures thereof are advantageous examples of acrylic polymers. Examples of alkaline compounds are alkaline salts, bases, and mixtures thereof, sodium carbonate, potassium carbonate, calcium carbonate, and mixtures thereof being particularly well suited as alkaline salts, potassium hydroxide, sodium hydroxide, and mixtures thereof being particularly well suited as bases.

As additives which are compatible with the polymeric resin of the invention, there will be added advantageously, as already set forth previously, a or mixtures of a wetting agent, an antifoaming agent, an adherence promoter, a surfactant or a colorant. In this respect, interesting wetting agents are silanes, fluoroaliphatic polymer esters or further products having a high 2-butoxyethanol content. Products of this type which are on the market are Dapro and Schwego-wett (registered trademarks). As anti-foaming agents, use will advantageously be made of chemical compositions based on hydrophobic organic solids dispersed in paraffin liquids such as Dapro (registered trademark). As adherence promoters, use will be made of water soluble or miscible materials containing functional groups which are able to attack the surface of the substrate, such as amine, carboxylate, and/or methacryloxy groups, such as the product named commercially Manchem or PM925 (registered trademark) of Shipley. As surfactants, use will be made of hydrocarbonated surfactants, hydrocarbonated glycols or vegetable oils such as for example Troykyd (registered trademark) D666, D333 and D999 and finally, the colorants are mainly pigments based on titanium oxide such as Tiona (registered trademark). These agents are however mentioned in a non-limiting way. In a general way, most of the water soluble additives, in particular those used in paints, may be employed.

As to the concentrations of the different constituents of the polymeric resins of the invention, these concentrations depend of course on the nature of these constituents and of the used solvent. However, the palladium salt will be used, in a general way according to the invention, in a concentration, in weight per cent, of 0.05 to 5% and preferably of 0.1 to 1.0%, the complexing agent of the carboxylic acid or chloride type in a concentration, in weight percent, of 0.01 to 5% and preferably of 0.04 to 2%, the polymer containing hydroxyl and/or carboxyl groups in a concentration, in weight percent, of 0.1 to 15% and preferably of 0.1 to 7% and the alkaline salt in a concentration, in weight percent, of 0.01 to 5% and preferably of 0.01 to 2.5% or the base in a concentration, in weight percent, of 0.1 to 2.5% and preferably of 0.1 to 1.5%. The total concentration of agents or additives, in weight per cent, is of 0.01 to 5% and preferably of 0.01 to 3%.

The polymeric resins of the invention are new molecules, more particularly coordination complexes formed from the mixture of the four compound types it contains and from the solvent. In fact, the complexing agent of the carboxylic acid type is bound to the Pd(II) salt to form a coordination complex stabilized in the solution thanks to the presence of the cellulose and/or acrylic polymer, which plays also the role of complexing agent to form an oligomer if it contains carboxyl groups. The alkaline compound permits in fact to bring the product, which is strongly acid and consequently extremely corrosive, within a pH range of 1 to 10, in particular for being able to use it in application devices therefor.

The polymeric resins of the invention are prepared according to a particular mixing process. In a first phase, the palladium salt and the complexing agent are mixed, in a first receptacle, in two-thirds of the total solvent volume and the polymer, in a second receptacle, in the remaining third of the total solvent volume. After having dissolved the respective constituents completely, the solution of the first receptacle is added to the solution of the second receptacle or vice versa, the whole is mixed, the pH is adjusted to the desired value between 1 and 10 by adding the alkaline compound and finally, in function of the final use of the polymeric resin, the different additives such as the wetting agent, the antifoaming agent, the adherence promoter, the surfactant or further the colorant are incorporated. This three phase process permits to obtain a limpid product without precipitate. Such a limpidity can not be obtained if the four constituents are mixed in bulk in the solvent. The mixing conditions (mixing speed and temperature) are not critical in so far as the constituents are entirely dissolved in the solvent. The process is generally performed at room temperature. The viscosity of the thus obtained polymeric resins is situated generally between 2 and 15000 cps and preferably between 3 and 5000 cps. As it has already been mentioned, the main advantage of a resin of adjustable viscosity consists in the fact that the product can be used with different existent application techniques and this on any substrate. In order to extend this use, the pH is adjusted by adding a base or an alkaline compound so as to obtain the desired pH between 1 and 10. Compounds, such as the above mentioned wetting agents, antifoaming agents, adherence promoters, surfactants and colorants, taken alone or in combination, can further be added thereto in order to obtain a good wettability of the resin, in particular on plastic substrates, to avoid foaming problems when passing it through ink jet devices, and to obtain a good adherence of the metal deposit without pretreatment of the substrate. The autocatalytic, either selective or not metallization is obtained either by immersing the Pd(II) resin coated substrate directly into the autocatalytic bath [chemical reduction into catalytic palladium Pd(0)] or by previously decomposing the Pd(II) resin photochemically with U.V. lamps (mercury vapour) or with an excimer laser through a mask, or further thermally in an oven or by irradiation with a visible or infrared laser into catalytic palladium Pd(0).

The nature of the polymers (cellulose and/or acrylic) is extremely important in this respect. If use is for example made of polymers such as polyacrylamide, poly(N-isopropylamide), poly(methacrylamide), poly(2-methoxyethoxyethylene) or a polyvinyl, the coordination complex producing the metallization permitting catalytic effect is not formed. Consequently, there is obtained no metallization, the obtained resins are not stable and their viscosity is not adjustable. The nature of the solvent is also important. The use of an organic solvent other than methanol or ethanol destroys for example the coordination complex and annihilates the metallization permitting catalytic effect. When use is made for example of acetone or isopropanol, the resin is unstable and no metallization can be obtained.

Some examples of polymeric resins of the invention are given hereinafter as well as their application techniques.

EXAMPLE 1

U.V. irradiation

| Composition of the resin | |
| --- | --- |
| $PdCl_2$ | 0.75% by weight |
| Tartaric acid | 0.12% by weight |
| Carboxymethylcellulose | 0.4% by weight |
| $Na_2CO_3$ | 2% by weight |
| The remaining part is demineralized water or methanol. | |

In a first receptacle, the palladium chloride and the tartaric acid are mixed in ⅔ of the total water or methanol volume and the carboxymethylcellulose and the sodium carbonate are mixed, in a second receptacle, in the remaining ⅓ of water or methanol. After having dissolved the constituents completely, the first solution is added to the second solution and the whole is mixed again to obtain a limpid liquid without precipitate.

Tested substrates

Ceramics, $Al_2O_3$ and plastics (epoxy, polycarbonate, polyimide).

Application of the resin

Spin-coating at an acceleration of 400 rotations/min/sec and a speed of 1000 rotations/minute for 60 seconds and drying for 30 seconds by means of a thermoventilator.

The whole is subsequently irradiated through a mask with a 500 W mercury vapour lamp for 1 hour. The non-irradiated resin is then removed by rinsing the sample under a jet of demineralized water. The irradiated parts are then metallized with a copper or nickel deposition by immersing the sample into an autocatalytic copper or nickel bath.

EXAMPLE 2

Metallization by means of plotter table

| Composition of the resin | |
| --- | --- |
| $PdCl_2$ | 0.25% by weight |
| Succinic, gluconic or tartaric acid or HCl or NaCl | 0.04% by weight |
| Acrylic polymer, hydroxypropylmethylcellulose or carboxymethylcellulose | 0.4% by weight |
| KOH | 1% by weight |
| The remaining part is demineralized water or methanol. | |

The resin is prepared in the same way as in example 1.

Tested substrates

Ceramics, $Al_2O_3$ and plastics (epoxy, polycarbonate, polyimide, PVC).

Application of the resin

The resin is applied in the reservoir of a plotter pen ("rotring") Rapidoplot (registered trademark) having a diameter of 0.70, 0.35 and 0.25 mm respectively, which pen is disposed on a plotter table linked to a PC. The plotter makes the desired drawing with the resin on the substrate. The whole is dried with a thermoventilator. The drawing is then metallized with a copper or nickel deposition by immersing the sample in an autocatalytic copper or nickel bath.

EXAMPLE 3

Direct metallization by means of a brush

| Composition of the resin: | |
| --- | --- |
| $PdCl_2$ | 0.25% by weight |
| Succinic, mesoxalic, gluconic, tartaric, malic, citric, atactic polyacrylic or polymetacrylic acid | 0.04% by weight |
| Acrylic polymer or hydroxypropylmethylcellulose | 0.4% by weight |
| $Na_2CO_3$ | 2% by weight |
| The remaining part is demineralized water or methanol. | |

The resin is prepared in the same way as in example 1.

Tested substrates:

Ceramics, $A_2O_3$ and plastics (epoxy, polycarbonate, polyimide, PVC).

Application of the resin:

The resin is coated onto the substrate by means of a brush. The whole is dried with a thermoventilator. The drawing is then metallized with a copper or nickel deposition by immersing the sample in an autocatalytic copper or nickel bath.

It will be noted that in case of direct metallizations, an activation of the resin after having coated it onto the substrate is recommended for copper deposition, this activation may be thermal (250° C.), photochemical (mercury vapour lamp) or chemical (steeping the substrate with the resin in a 20% by weight sodium hypophosphite solution heated to 80° C.).

EXAMPLE 4

Direct metallization by ink jet thermal activation

Composition of the resin (ink):

| | |
|---|---|
| PdCl$_2$ | 0.25% by weight |
| Tartaric or other acids (see example 3) | respectively 0.04, 1.06 or 0.2% by weight |
| Carboxymethylcellulose | 1.80% by weight |
| Potassium hydroxide | 0.2% by weight |
| Wetting agent (fluoroaliphatic polymer esters) | 0.1% by weight |
| The remaining part is demineralized water. | |

The palladium chloride and the tartaric acid are mixed, in a first receptacle, in ⅔ of the total water volume and the carboxymethylcellulose and 0.02% by weight potash are mixed in a second receptacle, in the remaining ⅓ of the water volume. After having dissolved the constituents completely, the first solution is added to the second solution and the whole is mixed again to obtain a limpid liquid without precipitate. The pH is then adjusted to 7 by adding 0.18% of potash. Subsequently, the wetting agent is added. The thus obtained resin is filtered over 1 μm absolute.

Tested substrates

Ceramics, glass, plastics: polyimide, polyetherimide [Ultem (registered trademark) of General Electrics].

Application of the resin:

The resin is applied in the ink reservoir of an ink jet device [IMAJE Jaime 1000 S3 TP or HP DeskJet (registered trademark) for example]. The device makes the desired drawing (or circuit) with the resin onto the substrate. The whole is subsequently heated to 250° C. to activate the resin. The drawing is then metallized with a copper or nickel deposition by immersing the sample in an autocatalytic copper or nickel bath.

EXAMPLE 5

Direct metallization by ink jet photochemical activation

Composition of the resin (ink):

| | |
|---|---|
| PdCl$_2$ | 0.125% by weight |
| Tartaric or other acid (see example 3) | respectively 0.02, 0.5 or 0.1% by weight |
| Carboxymethylcellulose | 1.80% by weight |
| Potassium hydroxide | 0.2% by weight |
| Wetting agent (fluoroaliphatic polymer esters) | 0.1% by weight |
| The remaining part is demineralized water. | |

The palladium chloride and the tartaric acid are mixed, in a first receptacle, in ⅔ of the total water volume and the carboxymethylcellulose and 0.02% by weight potash are mixed, in a second receptacle, in the remaining ⅓ of the water volume. After having dissolved the constituents completely, the first solution is added to the second solution and the whole is mixed again to obtain a limpid liquid without precipitate. The pH is then adjusted to 7 by adding 0.18% of potash. Subsequently, the wetting agent is added. The thus obtained resin is filtered over 1 μm absolute.

Tested substrates:

Ceramics, glass, plastics: polyimide, polyetherimide, PVC, epoxy, ABS, polycarbonate, polyamide, etc.

Application of the resin:

The resin is applied in the ink reservoir or an ink jet device [IMAJE Jaime 1000 S3 TP or HP DeskJet (registered trademarks) for example]. The device makes the desired drawing (or circuit) with the resin onto the substrate. The whole is insolated with a U.V. lamp (chromatogram developer) to activate the resin. The drawing is then metallized with a copper or nickel deposition by immersing the sample in an autocatalytic copper or nickel bath.

EXAMPLE 6

Direct metallization by plotter photochemical activation

Composition of the resin (ink)

| | |
|---|---|
| PdCl$_2$ | 0.25% by weight |
| Tartaric or other acid (see example 3) | 0.02% by weight |
| Hydroxypropylmethylcellulose or methylcellulose | 0.4% by weight |
| Potassium hydroxide | 0.3% by weight |
| Adherence promoter [PM925 (registered trademark) of Shipley] | 0.5% by weight |
| The remaining part is demineralized water. | |

The palladium chloride and the tartaric acid are mixed, in a first receptacle, in ⅔ of the total water volume and the cellulose polymer and 0.02% by weight of potash are mixed, in a second receptacle, in the remaining ⅓ of the water volume. After having dissolved the constituents completely, said first solution is added. The pH is then adjusted to 7 by adding the remaining potash. Then, the adherence promoter is added.

Tested substrates

Ceramics, glass, plastics: polyimide, polyetherimide, PVC, epoxy, ABS, polycarbonate, polyamide, etc.

Application of the resin:

The resin is applied in the reservoir of a plotter pen ("rotring") Rapidoplot (registered trademark), having a diameter of 0.70, 0.50, 0.35 and 0.25 mm respectively, which is itself disposed on a plotter table linked to a PC. The plotter makes the desired drawing (or circuit) with the resin onto the substrate. The whole is then insolated with a U.V. lamp (chromatogram developer) to activate the resin. The drawing is then metallized with a copper or nickel deposition by immersing the sample in an autocatalytic copper or nickel bath.

As it has just been shown in the examples, the polymeric resins of the invention can be applied either selectively or not onto the substrate, not only by means of an ink jet, a plotter table pen, a brush, but also by means of a ball-point pen, a pen, a pad, by serigraphy, by means of a laser or by spraying.

Concrete applications of the polymeric resins of the invention are in a non limiting way, metallizing vias, making prototypes of printed circuits, manufacturing printed circuits, manufacturing sensors, making electromagnetic protections, and manufacturing decorations.

It has to be understood that the present invention is in no way limited to the hereinabove described embodiments and that many modifications can be applied thereto without leaving the scope of the present patent.

We claim:

1. A polymeric resin of adjustable viscosity and pH for depositing catalytic palladium on a substrate, and comprising, in combination, a palladium salt, a carboxylic acid or chloride complexing agent a water soluble polymer containing hydroxyl and/or carboxyl groups, an alkaline compound and a solvent chosen amongst water, methanol and ethanol.

2. The resin as claimed in claim 1, wherein the palladium salt is chosen amongst palladium chloride, palladium sulphate, palladium nitrate, and mixtures thereof.

3. The resin as claimed in claim 1, wherein said complexing agent is chosen in the group comprising carboxylic acids, μ-hydroxycarboylic acids, carboxylic polyacids, and mixtures thereof.

4. The resin as claimed in claim 3, comprising, as said complexing agent, a carboxylic acid chosen amongst succinic acid, mesoxalic acid, gluconic acid, and mixtures thereof.

5. The resin as claimed in claim 3, comprising, as said complexing agent, an μ-hydroxycarboxylic acid chosen amongst tartaric acid, malic acid, citric acid, and mixtures thereof.

6. The resin as claimed in claim 3, comprising, as said complexing agent, a carboxylic polyacid chosen amongst atactic polyacrylic acid, polymethacrylic acid, and mixtures thereof.

7. The resin as claimed in claim 1, wherein the chloride complexing agent is chosen amongst hydrochloric acid and chlorinated salts.

8. The resin as claimed in claim 1, wherein the hydroxyl and/or carboxyl groups containing polymer is chosen amongst cellulose polymers, acrylic polymers, and mixtures thereof.

9. The resin as claimed in claim 8, comprising, as cellulose polymer, carboxymethylcellulose, hydroxypropylmethylcellulose, or mixtures thereof.

10. The resin as claimed in claim 8, comprising, as acrylic polymer, polyacrylic acid, polymethacrylic acid, or a mixture thereof.

11. The resin as claimed in claim 1, wherein said alkaline compound is an alkaline salt, a base, or a mixture thereof.

12. The resin as claimed in claim 11, wherein said alkaline compound is an alkaline salt chosen in the group comprising sodium carbonate, potassium carbonate, calcium carbonate, and mixtures thereof.

13. The resin as claimed in claim 12, comprising said alkaline salt in a concentration, in weight percent, of 0.01 to 5%.

14. The resin as claimed in claim 12, comprising said alkaline salt in a concentration, in weight percent, of 0.01 to 2.5%.

15. The resin as claimed in claim 11, wherein said alkaline compound is a base chosen amongst potassium hydroxide, sodium hydroxide, and mixtures thereof.

16. The resin as claimed in claim 15, comprising said base in a concentration, in weight percent, of 0.01 to 2.5%.

17. The resin as claimed in claim 15, comprising said base in a concentration, in weight percent, of 0.1 to 1.5%.

18. The resin as claimed in claim 11, comprising at least a wetting agent, a colorant, an adherence promoter, a surfactant, or an antifoaming agent, or a combination of two or more of these agents.

19. The resin as claimed in claim 18, comprising, as wetting agent, at least a silane, a fluoroaliphatic polymer ester, or a product comprising 2-butoxyethanol.

20. The resin as claimed in claim 18, comprising, as adherence promoter, a water soluble or miscible compound containing functional groups which are able to attack the surface of the substrate, selected from the group consisting of amines, carboxylates and/or methacryloxy.

21. The resin as claimed in claim 18, comprising, as colorant, a titanium oxide pigment.

22. The resin as claimed in claim 18, comprising said agent(s) in a total concentration, in weight percent, of 0.01 to 5%.

23. The resin as claimed in claim 18, comprising 0.25% by weight of palladium chloride, 0.04% by weight of succinic, mesoxalic, gluconic, tartaric, malic, citric, atactic polyacrylic or polymethacrylic acid, 1.8% by weight of carboxymethyl cellulose, 0.2% by weight of potassium hydroxide and 0.1% of fluoroaliphatic polymer esters.

24. The resin as claimed in claim 18, comprising 0.25% by weight of palladium chloride, 1.06% by weight of succinic, mesoxalic, gluconic, tartaric, malic, citric, atactic polyacrylic or polymethacrylic acid, 1.8% by weight of carboxymethyl cellulose, 0.2% by weight of potassium hydroxide and 0.1% by weight of fluoroaliphatic polymer esters.

25. The resin as claimed in claim 18, comprising 0.25% by weight of palladium chloride, 0.2% by weight of succinic, mesoxalic, gluconic, tartaric, malic, citric, atactic polyacrylic or polymethacrylic acid, 1.8% by weight of carboxymethyl cellulose, 0.2% by weight of potassium hydroxide and 0.1% by weight of fluoroaliphatic polymer esters.

26. The resin as claimed in claim 18, comprising 0.125% by weight of palladium chloride, 0.02% by weight of succinic, mesoxalic, gluconic, tartaric, malic, citric, atactic polyacrylic or polymethacrylic acid, 1.8% by weight of carboxymethyl cellulose, 0.2% by weight of potassium hydroxide and 0.1% by weight of fluoroaliphatic polmer esters.

27. The resin as claimed in claim 18, comprising 0.125% by weight of palladium chloride, 0.5% by weight of succinic, mesoxalic, gluconic, tartaric, malic, citric, atactic polyacrylic or polymethacrylic acid, 1.8% by weight of carboxymethyl cellulose, 0.2% by weight of potassium hydroxide and 0.1% by weight of fluoroaliphatic polymer esters.

28. The resin as claimed in claim 18, comprising 0.125% by weight of palladium chloride, 0.1% by weight of succinic, mesoxalic, gluconic, tartaric, malic, citric, atactic polyacrylic or polymethacrylic acid, 1.8% by weight of carboxymethyl cellulose, 0.2% by weight of potassium hydroxide and 0.1% by weight of fluoroaliphatic polymer esters.

29. The resin as claimed in claim 18, comprising said agent(s) in a total concentration, in weight percent, of 0.01 to 3%.

30. The resin as claimed in claim 11, comprising said palladium salt in a concentration, in weight percent, of 0.05 to 5%.

31. The resin as claimed in claim 11, comprising said complexing agent in a concentration, in weight percent, of 0.01 to 5%.

32. The resin as claimed in claim 11, comprising said hydroxyl and/or carboxyl groups containing polymer in a concentration, in weight percent, of 0.1 to 15%.

33. The resin as claimed in claim 11, comprising demineralized water as solvent.

34. The resin as claimed in claim 1, comprising 0.75% by weight of palladium chloride, 0.12% by weight of tartaric acid, 0.4% by weight of carboxymethyl cellulose, 2.0% by weight of sodium carbonate, the remaining weight percent being demineralized water or methanol.

35. The resin as claimed in claim 1, comprising 0.25% by weight of palladium chloride, 0.04% by weight of succinic, gluconic, tartaric, or hydrochloric acid or sodium chloride, 0.4% by weight of polyacrylic acid, polymethacrylic acid, hydroxymethyl cellulose or carboxymethyl cellulose, 1% by weight of potassium hydroxide, the remaining weight percent being demineralized water or methanol.

36. The resin as claimed in claim 11, comprising 0.25% by weight of palladium chloride, 0.04% by weight of succinic, mesoxalic, gluconic, tartaric, malic, citric, atactic polyacrylic or polymethacrylic acid, 0.4% by weight of polyacrylic acid, polymethacrylic acid or hydroxymethyl cellulose, 2% by weight of sodium carbonate, the remaining weight percent being demineralized water or methanol.

37. The resin as claimed in claim 11, having a viscosity situated between 2 and 15000 cps.

38. The resin as claimed in claim 11, comprising said palladium salt in a concentration, in weight percent, of 0.1 to 1.0%.

39. The resin as claimed in claim 11, comprising said complexing agent in a concentration, in weight percent, of 0.04 to 2%.

40. The resin as claimed in claim 11, comprising said hydroxyl and/or carboxyl groups containing polymer in a concentration, in weight percent, of 0.1 to 7%.

41. The resin as claimed in claim 1, having a viscosity situation between 3 and 5000 cps.

* * * * *